METHOD AND MEANS OF SYNCHRONIZING TIMING PULSES OF A THREE CHANNEL TRIPLICATED SYSTEM

Filed July 27, 1967

INVENTORS
FRANK J. THOMAS
DAVID A. TAWFIK
BY Herbert L. Davis
ATTORNEY

INVENTORS
FRANK J. THOMAS
DAVID A. TAWFIK
BY Herbert L. Davis
ATTORNEY

Aug. 4, 1970 F. J. THOMAS ET AL 3,522,455

METHOD AND MEANS OF SYNCHRONIZING TIMING PULSES OF A THREE CHANNEL TRIPLICATED SYSTEM

Filed July 27, 1967 5 Sheets-Sheet 3

INVENTORS
FRANK J. THOMAS
DAVID A. TAWFIK

BY Herbert L. Davis

ATTORNEY

INVENTORS
FRANK J. THOMAS
DAVID A. TAWFIK
BY Herbert L. Davis
ATTORNEY

INVENTORS
FRANK J. THOMAS
DAVID A. TAWFIK
BY Herbert L. Davis
ATTORNEY

United States Patent Office 3,522,455

Patented Aug. 4, 1970

3,522,455

METHOD AND MEANS OF SYNCHRONIZING TIMING PULSES OF A THREE CHANNEL TRIPLICATED SYSTEM

Frank J. Thomas, West Paterson, N.J., and David A. Tawfik, Flushing, N.Y., assignors to The Bendix Corporation, a corporation of Delaware Filed July 27, 1967, Ser. No. 656,499
Int. Cl. H03k *5/01, 17/28*
U.S. Cl. 307—269 11 Claims

ABSTRACT OF THE DISCLOSURE

A method and means of synchronizing timing pulses of a three channel triplicated system by provision of a feedback control derived from a voted output to fire a relaxation oscillator network to provide synchronization of the timing pulses so that the period, pulse width, and phase of the timing pulses in all three channels of the triplicated system are synchronized, while temperature variations in the period, pulse width and phase of the timing pulses are minimized, and further through the voter arrangement there is provided a majority logic network which will function as long as any two of the three inputs to the voter agree so as to effect a fail-operative feature in the system, due to the voter arrangement.

BACKGROUND OF THE INVENTION

Field of the invention

The present invention relates to a method and means of synchronizing timing pulses of a three channel triplicated system so that timing pulses for triplicated counters may be maintained in synchronization. Since the period, the pulse width and the phase of the timing pulses are dependent on capacitors and resistors, it becomes very difficult to fix these parameters, particularly in that with temperative deviations it becomes impossible to maintain the timing pulses identical without a synchronzation network.

Description of the prior art

Heretofore, fail-operative control and computing systems have been constructed using (1) triple redundancy with on-line majority voting to select proper signals and (2) off-line monitoring to detect and/or display failure status of the voted equipment, as described in U.S. Pat. No. 3,289,193 granted Nov. 29, 1966 to Robert L. Worthington and Frank J. Thomas; U.S. Pat. No. 3,305,-735 granted Feb. 21, 1967 to Harold Moreines and U.S. Pat. No. 3,311,837 granted Mar. 28, 1967 to Harold Moreines and all of which patents have been assigned to The Bendix Corporation.

Furthermore, in a copending U.S. application Ser. No. 596,994 filed Nov. 25, 1966 by Harold Moreines there is disclosed a redundant integrator system including feedback means to slave the outputs of a plurality of integrators to the output of a selected integrator so as to maintain during normal operation of the redundant system all of the individual integrator outputs in close correspondence with the selected integrator output so as to preclude output differences from exceeding monitor threshold levels and thereby avoid the actuaton of nuisance alarms.

Moreover, there has been disclosed in a U.S. Pat. No. 3,297,955 granted Jan. 10, 1967 to Philip D. Corey and Edward H. Dinger a synchronizing network for a number of oscillators. In this network each relaxation oscillator drives a multivibrator, the output of which is gated with the output of the other multivibrators, so that the highest frequency oscillator causes the other oscillators to oscillate at the same rate. Further, a U.S. Pat. No. 3,104,330 granted Sept. 17, 1963, to Douglas J. Hamilton shows a synchronizing system for driving a number of flip-flops. The circuit utilizes a master clock pulse driver which drives a plurality of other clock pulse drivers simultaneously. Each pulse driver then drives a plurality of loads such as flip flops, while a U.S. Pat. No. 3,163,824 granted Dec. 29, 1964 to Norman R. Crain dicloses a synchronous timing circuit utilizing both mono-stable and bi-stable circuits, the bi-stable circuit being used to provide synchronization for the mono-stable unit.

The present invention relates to a distinctly different method and means from that of the aforenoted prior art for synchronizing timing pulses of a three channel triplicated timing system as well as provide a method and means to compensate for temperature variations and provide a fail-operative control.

SUMMARY OF THE INVENTION

In distinction, the present invention contemplates the provision of a slaving method and means that in effect selects a majority output of a triplicated timing system as the system response and forces the other timers to maintain their outputs within close correspondence to the selected majority output so as to render possible the use of such timers in triple redunant systems.

Another object within the contemplation of the present invention is to provide means whereby the output timing pulses of a triplicated timing system may be synchronized by a feedback method and means effective upon a majority of the timers providing an output pulse to initiate the timing cycle for all of the timers, and the feedback method and means is further effective upon a majority of the timers providing a second pulse upon cessation of the timing cycle to terminate the timing cycle of all the timers.

Another object of the invention is to provide in a redundant timing system, feedback voter means whereby the timing outputs of a plurality of timers may be slaved to the timing output of a majority of the timers, thereby maintaining all of the individual timer outputs in close correspondence with the output of the majority of the timers.

Another object of the invention is to provide in such a redudant timer system three redundant timing channels, each channel being comprised of a timer having a timed electrical output connected to a voting network which is also responsive to the timed electrical outputs from the timers in the remaining channels, together with a slaving control network for each timer responsive to an electrical output from the voting network corresponding to that of the selected majority channel and arranged in a feedback relationship so as to provide a slaving signal responsive to a majority of the timing outputs from the timers to effectively initiate and terminate the timing operation of all of the timers.

Another object of the invention is to provide in said redundant timer system three redundant timing channels, each channel comprised of a timer including a unijunction transister relaxation oscillator including a timing capacitor, the oscillator being coupled with a one shot multivibrator to trigger a timed pulse from the multi-vibrator, a majority logic voter to pass a majority of the timed pulses generated by the multivibrators in the respective channels so as to provide as an output of the voter an electrical pulse which follows a majority of the timed pulses, i.e. the leading edge of the voted pulse follows the second leading edge of the three timing pulses while the succeeding edge of the voted pulse follows the second succeeding edge of the three timing pulses (majority logic; output=$AB+BC+AC$) and which voted or electrical output pulse from the voter is then applied through a feedback means which is responsive to the leading edge of the voter output pulse to effect a discharge of the timing capacitor of the controlling oscillator, thus terminating the timing period of the oscillator, while the feedback means is thereafter responsive to the succeeding edge of the voter output pulse to initiate the charging of the timing capacitor of the controlling oscillator to start the timing cycle one again.

Another object of the invention is to provide in the foregoing feedback synchronizing method and means, a three channel triplicated timing system including similar timers, majority logic voters and feedback networks in all three channels so that all deviations in period, pulse width and phase of the timing networks may be effectively eliminated, while through the feedback arrangement the effects of variations of the ambient temperature on the several component parts of the respective channels and the output timing pulses may be minimized and further through the provision of the majority logic network, the feedback arrangement provides a fail-operative feature which functions to maintain synchronization of the several timing channels so long as any two of the three electrical timing pulses are in substantial accord.

Thus, a further object of the invention is to provide a method and means whereby (1) the period, pulse width, and phase of electrical timing pulses in all three channels of a triplicated system are effectively synchronized; (2) variations in the period, pulse width and phase of the electrical timing pulses due to changes in the ambient temperature are effectively minimized; and (3) there is provided a method and means for synchronizing the timing pulses which includes a fail-operative protective feature which is effective so long as a majority of the timing pulses are effective.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

Referring to the drawings in which corresponding numerals indicate corresponding parts in the several views.

DESCRIPTION OF THE INVENTION

Figure 1:
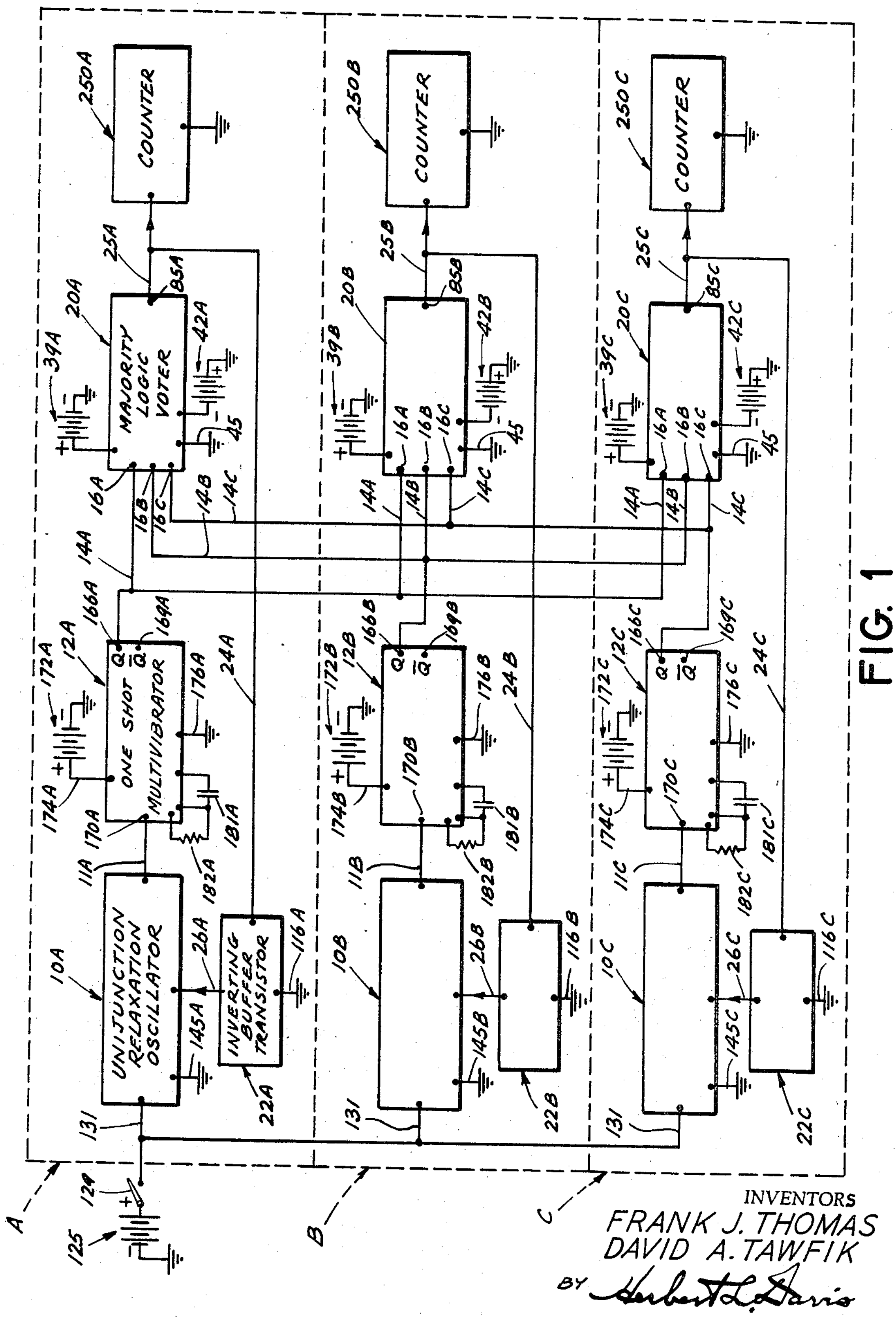
FIG. 1 is a block diagram of a triple redundant timing system embodying one form of the present invention.
Figure 3:
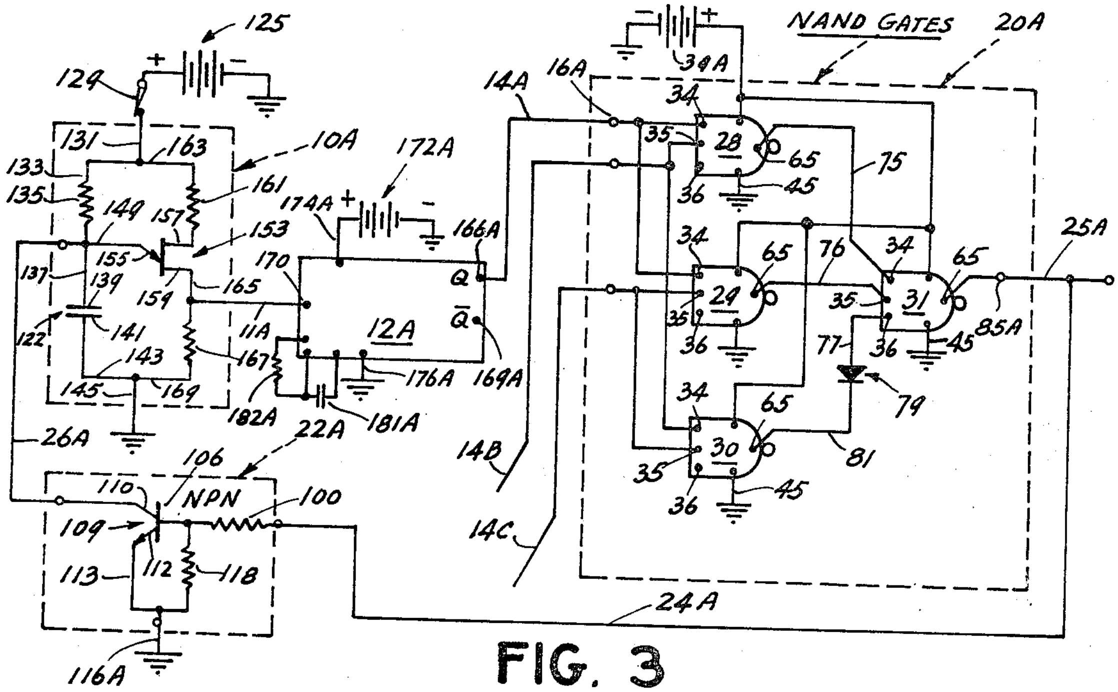
FIG. 3 is a wiring diagram illustrating the feedback network for each timing channel of the triple redundant timing system of FIG. 1 and showing a majority logic voter including "NAND" gates, an inverting buffer transistor and a unijunction transistor relaxation oscillator for controlling a multivibrator timer, together with the timing capacitor of the oscillator arranged to be selectively discharged through the inverter transistor of the feedback network in response to a positive going output timing pulse from the majority logic voter.

Referring to the drawing of FIG. 1, a triplicated synchronized timer network embodying the method and means of the present invention is shown by way of a block diagram while one of the timing channels is shown in somewhat greater detail by a wiring diagram of FIG. 3.

Considering then the block diagram of FIG. 1 in the light of the channel detail of FIG. 3, it will be seen that each of the three channels A, B, and C of the block diagram of FIG. 1 includes a unijunction transistor relaxation oscillator indicated generally by the numerals 10A, 10B and 10C coupled by respective trigger pulse output conductors 11A, 11B and 11C with a multivibrator 12A, 12B and 12C of conventional type which serve as a timer for the respective channels A, B and C. Each timer 12A, 12B and 12C has an output conductor 14A, 14B and 14C, connected to a corresponding input terminal 16A, 16B and 16C of a series of majority logic voter devices of conventional type indicated generally by the numerals 20A, 20B and 20C of the respective timer channels A, B and C.

There is further provided in each of the channels A, B and C a feedback inverter 22A, 22B and 22C having an input feedback line 24A, 24B and 24C leading from respective output lines 25A, 25B and 25C of the majority logic voter devices 20A, 20B and 20C, respectively. The feedback inverter 22A, 22B and 22C has a control line 26A, 26B and 26C, respectively, leading from the unijunction transistor relaxation oscillator 10A, 10B and 10C, respectively. The feedback inverter 22A, 22B and 22C effects synchronization between the respective timers in the channels A, B and C by controlling the initiation and termination of the triggering operation of the multivibrators 12A, 12B and 12C in accordance with the output pulses provided by a majority of the multivibrators 12A, 12B and 12C as sensed by the voters 20A, 20B and 20C, as hereinafter explained in greater detail.

In this connection, it should be borne in mind that the timing pulses generated in the respective channels A, B and C by the one shot multivibrators 12A, 12B and 12C, respectively, are applied to each of the majority logic voters 20A, 20B and 20C.

Figure 5:
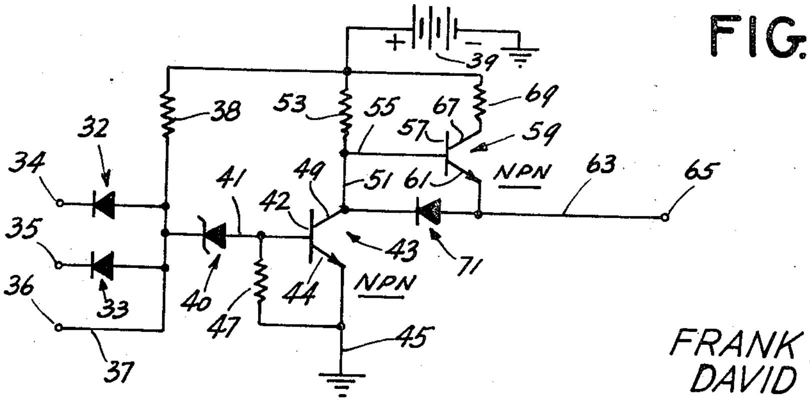
FIG. 5 is a wiring diagram of a typical "NAND" gate of a type that may be embodied in each of the timing channels of the system of the invention of FIGS. 1 and 3.

In the form of the invention illustrated by FIGS. 1 and 3 each of the majority logic voters 20A, 20B and 20C include "NAND" gates 28, 29 and 30 and a "NAND" gate 31 indicated generally in FIG. 3. The "NAND" gates may be of a conventional type and may be in a conventional arrangement such as shown by FIG. 5.

Thus, each of the "NAND" gates 28, 29, 30 and 31 includes two input diodes 32 and 33 each having a cathode element connected to respective input terminals 34 and 35. A third input terminal 36 is connected to an expander conductor 37 to which is also connected the anode elements of the diodes 32 and 33. The conductor 37 is connected through a resistor element 38 to a positive terminal of a battery 39 having a negative terminal connected to ground.

The anode elements of the input diodes 32 and 33 are also connected through the conductor 37 to a cathode element of a Zener diode 40 having an anode element connected through a conductor 41 to a base element 42 of a transistor 43 of an NPN type. The transistor 43 has an emitter element 44 connected through a conductor 45 to ground. A current limiting resistor 47 is connected between the conductor 41 leading to the base element 42 and the grounded conductor 45 leading from the emitter element 44 of the transistor 43.

The transistor 43 has a collector element 49 connected through a conductor 51 and resistor 53 to the positive terminal of the battery 39. A conductor 55 also leads from the conductor 51 to a base element 57 of a second NPN type transistor 59. The transistor 59 has an emitter 61 connected through a conductor 63 to an output terminal 65 of the NAND gate and a collector element 67 connected through a resistor 69 to the positive terminal of the battery 39.

Further connected between the output conductor 63 and the conductor 51 leading to the collector element 49 of the transistor 43 is a diode 71 having an anode element connected to the output conductor 63 and a cathode element connected to the conductor 51 so as to permit, upon the transistor 43 being rendered conductive, an effective flow of current through the diode 71 from the output conductor 63 to the conductor 51 and through the then conductive transistor 43 to ground through the conductor 45 for a purpose to be explained hereinafter.

The Zener diode 40 is of a type having a unique reverse current breakdown characteristic which permits conduction in the back direction when positive triggering voltages exceeding a predetermined value are applied to the cathode element of the Zener diode 40. Moreover, the Zener diode 40 in the reverse or back direction has a substantially constant threshold potential below which it is non-conductive and above which it is conductive and a substantially constant impedance when conductive.

In the majority logic voters 20A, 20B and 20C the "NAND" gates 28, 29 and 30 do not utilize the expander terminal 36 which is left open. Furthermore, the input terminal 34 of the "NAND" gate 28 is connected to the input terminal 16A of the majority logic voter 20 and the input terminal 34 of the "NAND" gate 29; the input terminal 35 of the "NAND" gate 28 is connected to the input terminal 16B of the majority logic voter 20 and the input terminal 34 of the "NAND" gate 30; the input terminal 35 of the "NAND" gate 29 is connected to the input terminal 16C of the majority logic voter 20 and the input terminal 35 of the "NAND" gate 30.

The output terminals 65 of the "NAND" gates 28 and 29 are connected through conductors 75 and 76 to input terminals 34 and 35 of the "NAND" gate 31 while the expander input terminal 36 of the "NAND" gate 31 is connected through a conductor 77 to an anode element of a diode 79 having a cathode element connected through a conductor 81 to the output terminal 65 of the "NAND" gate 30. The majority logic voter 20 has an output terminal 85 to which is connected the output terminal 65 of the "NAND" gate 31.

The arrangement of the "NAND" gates 28, 29 and 30 is such that so long as a negative pulse is applied to any one of the input terminals 34 or 35 of the "NAND" gates 28, 29 and 30 the voltage applied at the Zener diode of the corresponding Zener diode 40 will not be sufficient to exceed the threshold voltage of the Zener diode 40 whereupon base element 42 of the transistor 43 will be biased to the ground level and the transistor 43 will be non-conductive and the transistor 59 controlled thereby will be rendered conductive so as to apply a positive potential at the output terminal 65 of such "NAND" gate.

However, upon both of the input terminals 34 and 35 of any one of the "NAND" gates 28, 29 and 30 having applied thereto a positive going pulse, the voltage applied at the corresponding Zener diode 40 by the battery 39 in a reverse direction will be sufficient to exceed the threshold voltage of the Zener diode 40 whereupon the base element 42 of the transistor 43 will be positively biased to render the same conductive so as to render the transistor 59 non-conductive and apply a negative going pulse through the diode 71 to the output terminal 65.

The "NAND" gate 31 is similarly arranged and in addition utilizes the expander terminal 36 which is connected through the diode 79 to the output terminal 65 of the "NAND" gate 30 so that so long as positive going pulses are applied through the output lines 75, 76 and 81 of all of the "NAND" gates 28, 29 and 30, the "NAND" gate 31 will apply a negative going pulse to the output terminal 85 of the majority logic voter 20.

However, upon a negative going pulse being applied to any one of the output terminals 65 of the "NAND" gates 28, 29 and 30 indicative of positive going pulses being applied to a majority of the output lines 14A, 14B and 14C of the respective multivibrators 12A, 12B and 12C, there will be applied a positive going voted timing pulse to the output terminal 85 of the majority logic voter 20. This positive going voted timing pulse will terminate upon a majority of the output lines 14A, 14B and 14C having a negative going pulse applied thereto, as shown graphically by FIG. 6.

Figure 6:
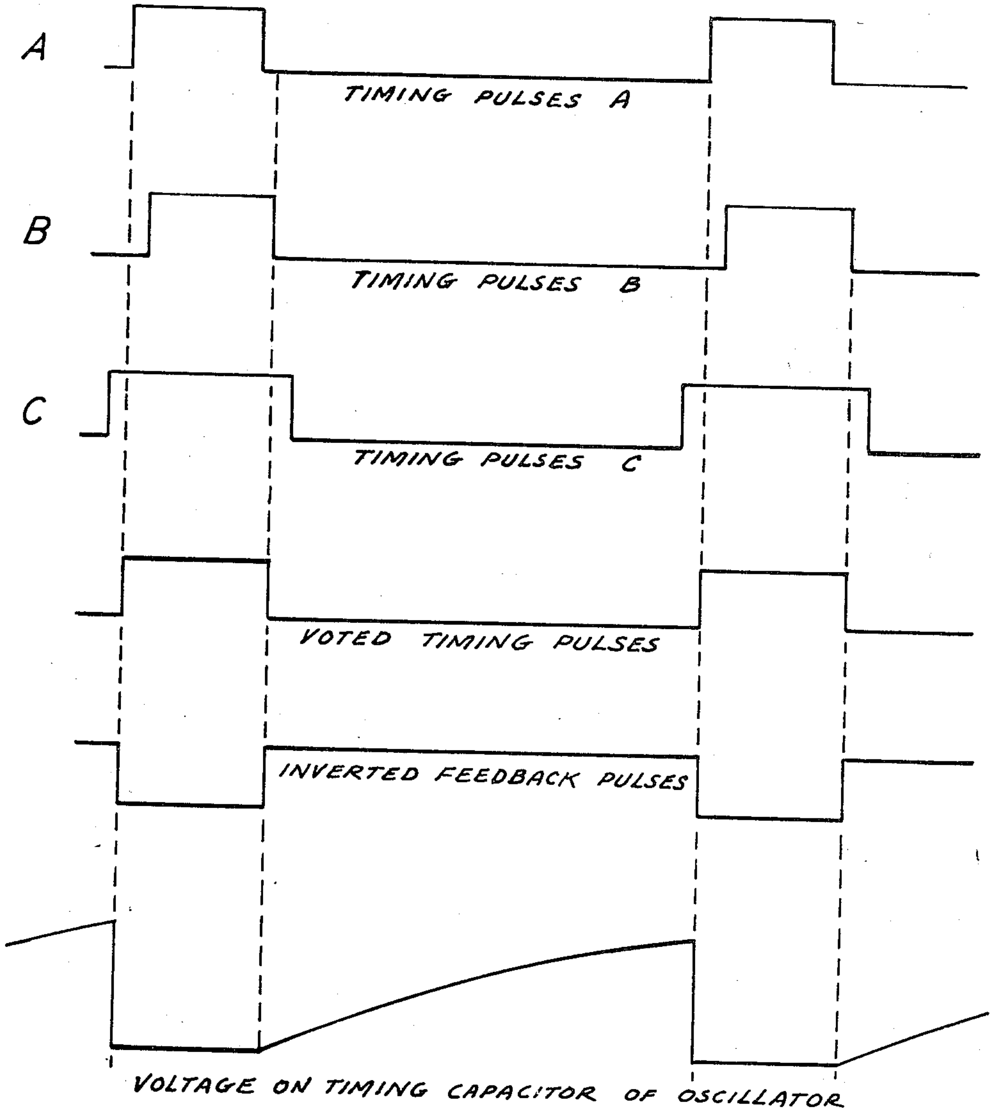
FIG. 6 is a comparative graphical illustration of the electrical wave form of typical positive timing pulses effected at the "Q" output terminal of each of the multivibrators in the respective timing channels of the system of FIG. 1, the wave form of the majority logic voted output positive pulses, the wave form of the inverted feedback negative going pulses effected by the buffer transistor inverter of FIGS. 1 and 3 in response to the voted positive output timing pulses and the wave form of the charging and discharging voltage on the timing capacitor of the oscillator effected in response to the inverted feedback positive going pulses.

The arrangement of the "NAND" gates 28, 29 and 30 and the "NAND" gate 31 in each of the majority logic voters 20A, 20B and 20C is such that there is applied to each of the voter output conductors 25A, 25B and 25C a positive going electrical output pulse whose leading edge follows the leading rising edge of the second or majority of the three positive timing pulses A, B and C, while the succeeding edge or falling edge of the voter output pulse follows the second succeeding edge or majority of the three positive timing pulses (majority logic; output$=AB+BC+AC$), as shown graphically in FIG. 6.

This output of the majority logic digital voter devices 20A, 20B and 20C, respectively, corresponding to the majority of the timing pulses, is then fed back through the feed back conductors 24A, 24B and 24C to the inverters 22A, 22B and 22C in the respective channels A, B and C. The positive going feedback signal is applied through a resistor element 100 in the feedback conductor 24A, as shown in FIG. 3, to a base element 106 of a transistor 109 in the inverter 22. The transistor 109 may be of a NPN type having a collector element 110 and an emitter element 112 connected by a conductor 113 to a grounded conductor 116. Further connecting the base element 106 to the grounded conductor 116 is a resistor 118.

The collector element 110 of the transistor 109 is in turn connected through the conductor 26A to the unijunction transistor relaxation oscillator 10A so as to effectively control the charging and discharging of a timing capacitor 122 of the oscillator 10 for effecting an output trigger pulse, as hereinafter explained.

Thus upon the leading edge of the positive voted output timing pulse being applied back through the feedback line 24A, the transistor 109 of the inverter 22A is rendered conductive to terminate the charging cycle of the capacitor 122 of the oscillator 10A and any resultant trigger pulse, while the succeeding or falling edge of the positive output voter timing pulse, as shown in FIG. 6, will render the transistor 109 of the inverter 22A nonconductive so as to in turn initiate the charging cycle of the capacitor 122.

Since similar voter and feedback networks are present in all three channels A, B and C, all deviations in period, pulse width, and phase of the timing networks are eliminated. The same feedback principle also minimizes temperature variations. A fail-operative feature is embodied in the system, because of the provision of the voters 20A, 20B and 20C. Each voter is a majority logic device which will function as long as any two of the inputs agree.

Each relaxation oscillator 10A, 10B and 10C includes a charging circuit for the capacitor 122 which comprises a source of electrical energy or battery 125 having a negative terminal connected to ground and a positive terminal selectively connected by an operator-operative switch 129 to a conductor 131 which leads through a conductor 133, resistor 135 and a conductor 137 in each oscillator 10A to a plate 139 of the timing capacitor 122 having an opposite plate 141 of the capacitor 122 connected through a conductor 143 to a grounded conductor 145.

Further connected to the conductor 137 is a conductor 26A leading to the collector element 110 of the inverter buffer transistor 109 and a conductor 149 leading from conductor 137 to an emitter terminal 155 of a unijunction transistor 153 having an emitter element 155, a base (2) element 157 and a base (1) element 159. The base (2) element 157 is connected through a resistor 161 and a conductor 163 to the conductor 131 leading through the closed switch 129 to the positive terminal of the battery 125. The opposite base (1) element 159 of the transistor 153 is connected through a conductor 165, a resistor 167 and a conductor 169 to the grounded conductor 145. Leading from the conductor 165 of the oscillator 10A is the trigger pulse conductor 11A leading to the trigger terminal 170 of the multivibrator 12A having a grounded input-output terminal 176A. The oscilaltors 10A, 10B and 10C are similarly arranged to initiate operation of the respective multivibrators 12A, 12B and 12C.

It will be seen from the foregoing that with the switch 129 closed and upon the discharge passage for the capacitor 122 through the conductor 26A being opened by the transistor 109 being rendered non-conductive, the charging of the capacitor 122 will be initiated through the resistor 135 by the battery 125 until the plate 139 of the capacitor 122 reaches a positive potential level such as to bias the emitter element 155 of the unijunction transistor 153 sufficiently to cause the same to fire. Thereupon the unijunction transistor 153 will be rendered conductive through the emitter 155 from the base (2) element 157 to the base (1) element 159 causing a positive triggering pulse to be applied through the output conductor 11 to the trigger terminal 170 of the one shot multivibrator 12A. This triggering pulse will cause the multivibrator 12A to apply a positive electrical output pulse through the output conductor 14A leading from the "Q" output terminal 166 of the multivibrator 12A to one of the input terminals 16A of each of the majority logic digital voters 20A, 20B and 20C.

Each of the one shot multivibrators 12A, 12B and 12C may be of a conventional type, such as may be purchased from Amelco Semiconductor Division of Teledyne, Inc., 1300 Terra Bella Ave., Mountain View, Calif., as a Type 342 Dual One Shot.

The operating characteristics of the one shot multivibrator 12 is such that normally the control network thereof is so balanced that a source of electrical energy or battery 172 having a negative terminal connected to ground and a positive terminal connected through a conductor 174 to the control network of the multivibrator 12 applies to the "$\overline{Q}$" output terminal 169 a positive potential and simultaneous to the "Q" output conductor 166 a ground potential.

However, upon the unijunction transistor 153 of the oscillator 10 firing, as heretofore explained, applying a positive trigger pulse through the output conductor 11 to the trigger terminal 170 of the multivibrator 12, there is simultaneously effected a positive pulse at the "Q" output terminal 166 and a ground pulse at the "$\overline{Q}$" terminal 169 in both cases for a duration determined by an external timing capacitor 181 and resistor 182 in a manner well known in the art.

MODIFIED FORM OF THE INVENTION OF FIGS. 2 AND 4

Figure 2:
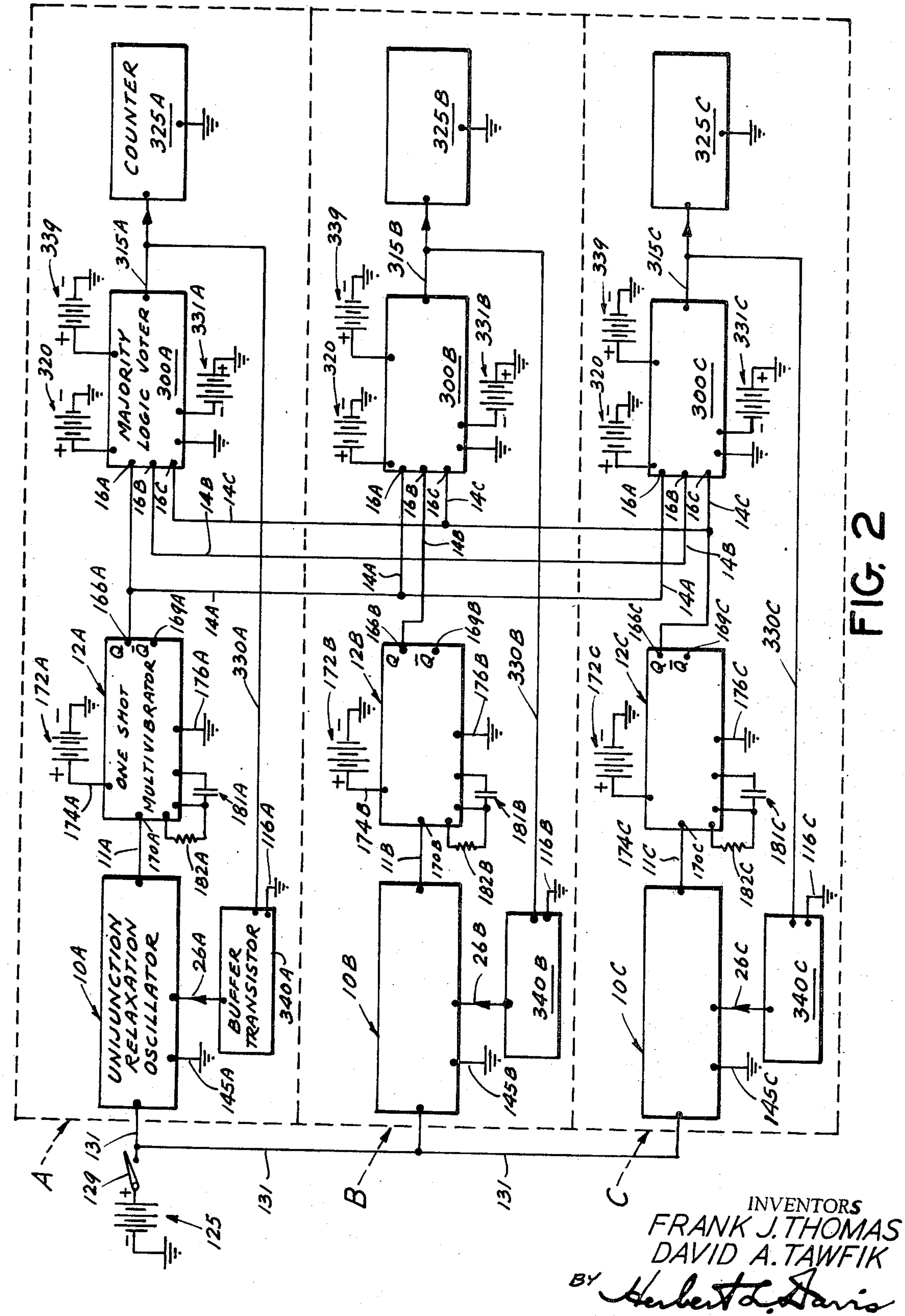
FIG. 2 is a block diagram of a triple redundant timing system embodying a modified form of the invention of FIG. 1.
Figure 4:
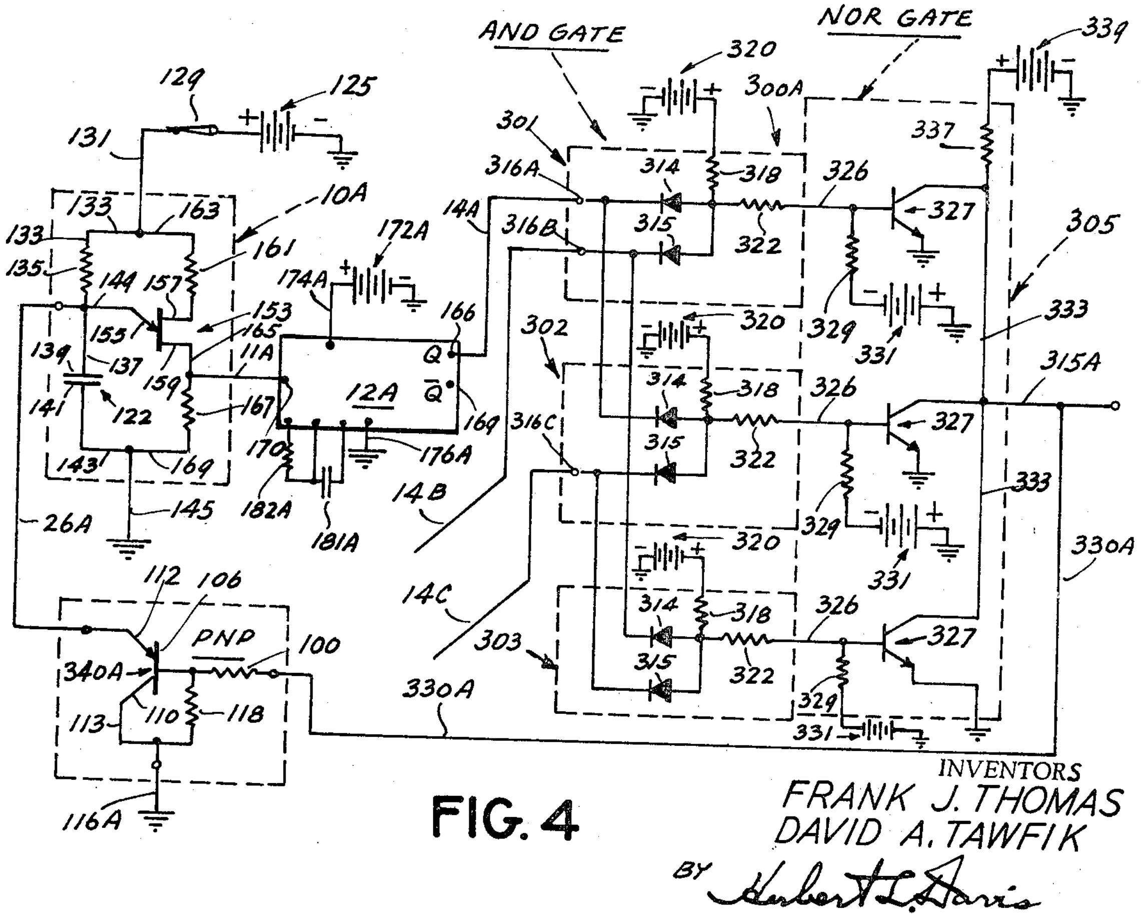
FIG. 4 is a wiring diagram illustrating the feedback network for each timing channel of the triple redundant timing system of FIG. 2 and showing a majority logic voter including "AND" gates and a "NOR" gate, a buffer transistor and a unijunction transistor relaxation oscillator for controlling a multivibrator, together with a timing capacitor of the oscillator arranged to be selectively discharged through the buffer transistor of the feedback network in response to negative going output timing pulses from the majority logic voter.

In the modified form of the invention to which FIGS. 2 and 4 are applicable, corresponding numerals indicate corresponding parts to those heretofore described with reference to FIGS. 1, 3 and 6. In place of the majority logic voters 20A, 20B and 20C of FIGS. 1 and 3, in the modified form of the invention of FIGS. 2 and 4, there are provided the majority logic voters 300A, 300B and 300C each of which includes three "AND" gates 301, 302 and 303 and a "NOR" gate 305. The "AND" gates may be of a conventional type and arrangement such as disclosed in the aforenoted U.S. Pat. No. 3,305,735.

In the majority logic voters 300A, 300B and 300C the "AND" gates 301, 302 and 303 each include two input diodes 314 and 315 in which a cathode element of the diode 314 of the AND gate 301 is connected to an input terminal 316A of the voter 300 and a cathode element of the diode 314 of the AND gate 302; the cathode element of the diode 315 of the "AND" gate 301 is connected to an input terminal 316B of the voter 300 and a cathode element of the diode 314 of AND gate 303; while the cathode element of the diode 315 of the AND gate 302 is connected to an input terminal 316C of the voter 300 and a cathode element of the diode 315 of the AND gate 303.

The anode element of each pair of diodes 314 and 315 of the respective AND gates are connected through a resistor element 318 to a positive terminal of a source of potential or battery 320 having a negative terminal connected to ground. The anode elements of the input diodes 314 and 315 are also connetced through resistor elements 322 to an output line 326 leading to inputs of the "NOR" gate 305.

The NOR gate 305 includes three transistors 327 of an NPN type each having a base element connected to one of the output conductors 326 leading from the respective "AND" gates 301, 302 and 303. Each of the transistors 327 has an emitter element connected to ground and a current limiting resistor 329 connecting each of the input conductors 326 to a negative terminal of a source of electrical energy 331 having a positive terminal connected to ground and arranged to negatively bias the base element and the transistor 327 to a nonconductive state.

Each of the transistors 327 further have a collector element connected by an output conductor 333 to an output conductor 315 leading from the majority voter 300. Further, the output conductor 333 is connected through a resistor element 337 to a positive terminal of a source of electrical energy 339 having a negative terminal thereof connected to ground. Each of the majority voters 300A, 300B and 300C have corresponding output conductors indicated in FIGS. 2 and 4 by the numerals 315A, 315B and 315C which in turn carry the voter output pulses for operating the counters 325A, 325B and 325C of conventional type. Feedback conductors 330A, 330B and 330C lead from the respective output conductors 315A, 315B and 315C to a buffer transistor 340A, 340B and 340C of a PNP type in which corresponding numerals indicated corresponding parts to those described with reference to the transistor 109 and responsive to the output applied at 315A, 315B and 315C to control the charging and discharging circuits for the timing capacitor 122 of the respective oscillators 10A, as shown in FIGS. 2 and 4.

The arrangement of the "AND" gates 301, 302 and 303 and the "NOR" gate 305 in each of the majority logic voters 300A, 300B and 300C is such that there is applied to each of the voter output conductors 315A, 315B and 315C a negative going electrical output pulse whose leading falling edge follows the leading rising edge of the second or majority of the three positive timing pulses A, B and C, while the succeeding edge or rising edge of the voter negative output pulse follows the second succeeding falling edge or majority of the three positive timing pulses (majority logic; output=$AB+BC+AC$).

This negative going voter output pulse from the majority logic voter devices 300A, 300B and 300C, respectively, corresponding to the majority of the timing pulses, in then fed back through feedback conductors 330A, 330B and 330C to the base of element 106 of respective PNP type buffer transistors 340A, 340B and 340C so as to render the same conductive to discharge the timing capacitor 122 of the respective relaxation oscillators 10A, 10B and 10C, respectively, as shown in FIG. 2. The buffer transistor 340 has a collector element 110 connected to ground through a conductor 113 and an emitter element 112 connected to the conductor 26 to control the charging and discharging of the timing capacitor 122 of the oscillator 10A of FIGS. 2 and 4.

Figure 7:
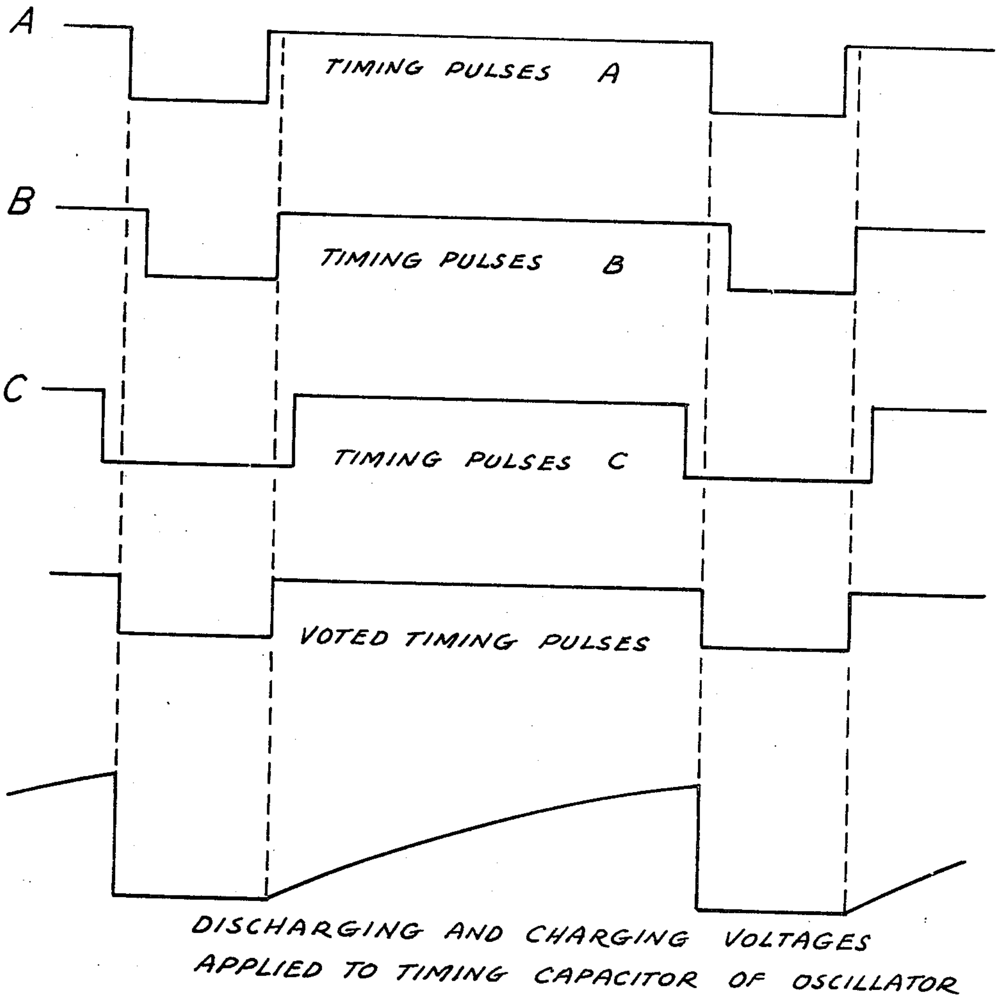
FIG. 7 is a comparative graphical illustration of the electrical wave forms of typical negative going timing pulses effected at the "$\overline{Q}$" output terminal of each of the multivibrators simultaneously with the positive going pulses shown graphically by FIG. 6 and effected at the opposite "Q" output terminal of the multivibrators of the respective timing channels of the systems of FIGS. 1 and 2, the wave form of the majority logic voted output negative going timing pulses effected by the majority logic network of FIGS. 1 and 3 when connected to the opposite "$\overline{Q}$" output of the multivibrator instead of the "Q" output, and the wave form of the charging and discharging voltage on the timing capacitor of the oscillator effected by a buffer transistor connected in the feedback network, as shown by FIGS. 2 and 4, and responsive to negative feedback voter timing pulses provided by operation of the majority logic voter in the aforenoted timing systems.

Thus upon the leading falling edge of the negative going voter output timing pulse being applied back through the feedback line 330A, as shown in FIG. 4, to the PNP type buffer transistor 340A any positive charge applied ot the plate 139 of the timing capacitor 122 will be rapidly discharged, as indicated graphically in FIG. 7, thus terminating the charging cycle of the capacitor 122 of the oscillator 10A and any resultant trigger pulse, while the succeeding or rising edge of the negative going output voted timing pulse will also be fed back through the feedback line 330A to in turn initiate the charging cycle of the capacitor 122 by rendering the PNP type transistor 340A non-conductive.

Since similar voter and feedback networks are present in all three channels A, B ad C of the modified form of invention of FIGS. 2 and 4, all deviations in period, pulse width and phase of the timing networks are eliminated. The same feedback principal will also minimize temperature variations. A fail-operative feature is embodied in the system, because of the provisions of the voters 300A, 300B and 300C. Each voter is a majority logic device which will function as long as any two of the inputs agree.

Thus the arrangement of the "AND" gates 301, 302 and 303 and the "NOR" gate 305 of the voter device 300A is such that only upon a positive going timing pulse being applied to both the diode 314 and the diode 315 of one or the other of the "AND" gates 301, 302 and 303 will a positive going pulse be applied through the output line 327 to the base of the corresponding control transistor 327 of the "NOR" gate 305. Upon such a positive going pulse being applied through the output line 326 to the base of the corresponding control transistor 327, the transistor 327 so biased will become conductive so as to reduce the positive going pulse applied through the output line 333 to the output line 315 to a negative going voted timing pulse, as indicated graphically in FIG. 7, any positive charge applied at such time to the plate 139 of the timing capacitor 122 will be thereupon discharged through the feedback line 330, conductors 315 and 333 and through the now conductive transistor 327 to ground.

On the other hand, upon the majority of the timing pulses applied by the respective multivibrators 12A, 12B and 12C through the lines 14A, 14B and 14C returning once again to a negative going pulse, the bases of the control transistors 327 will all be biased to a non-conductive condition. There will then be effective through the output line 315 of the several majority logic voter devices a positive going voted timing pulse which will be applied through the several feedback lines 330A, 330B and 330C to bias the PNP type buffer transistor 340 to a non-conductive state so as to render effective a charging cycle for the respective timing capacitors 122 in the several relaxation oscillators 10A, 10B and 10C of FIGS. 2 and 4.

The positive charge applied then by the battery 125 through the conductors 131, 133, resistor 135 and conductor 137 to the plate 139 of the capacitor 122 will build up to a potential level such as to bias the emitter terminal 155 of the unijunction transistor 153 sufficiently to cause the same to fire. Thereupon a positive going pulse will be applied through the unijunction transistor 153 to the output line 11A and thereby to the trigger terminal 170 of the multivibrator 12A to cause the multivibrator 12A to initiate a timing pulse at output line 14A, as heretofore explained. The oscillators 10A, 10B and 10C are similarly arranged to initiate operation of the respective multivibrators 12A, 12B and 12C.

Thus upon the oscillators 10A, 10B and 10C of FIGS. 2 and 4 causing a majority of the multivibrators 12A, 12B and 12C to apply positive going pulses through the output lines 14A, 14B and 14C to the voter devices 300A, 300B and 300C, the voter devices will then apply through the respective output lines 315A, 315B and 315C leading therefrom a negative going pulse which will then be fed back through the feedback line 330A to the buffer transistor 340 to discharge the capacitor, as shown graphically in FIG. 7.

Upon termination of the negative going pulse as determined by the timed positive output pulses effected by the majority of the multivibrators 12A, 12B and 12C a charging cycle for the timing capacitor 122 will be initiated and the timing action of the respective oscillators 10A, 10B and 10C will be repeated, as heretofore explained, with the discharging and charging cycles of the timing capacitor 122 of the oscillators 10A, 10B and 10C and the charging and discharging cycles of the timing capacitor 181 of the multivibrators 12A, 12B and 12C being repeated until such time as the operation of the system is terminated by the opening of the operator-operative switch 129.

FURTHER MODIFIED FORMS

While in the forms of the invention illustrated by FIGS. 1, 2, 3 and 4 the "Q" output terminal 166 of the multivibrators 12A, 12B and 12C are shown connected through the output lines 14A, 14B and 14C to the respective input terminals 16A, 16B and 16C of the majority logic voters 20, it will be readily apparent that the "$\overline{Q}$" output terminal 169 may be used instead to provide timed output negative going pulses to the inputs of the majority logic voters 20 and 300.

Thus, for example, if in the form of the invention illustrated by FIGS. 1 and 3, the output lines 14A, 14B and 14C lead from the "$\overline{Q}$" output terminals 169A, 169B and 169C of the respective multivibrators 12A, 12B and 12C, then timed negative going pulses will be applied to the respective input terminals 16A, 16B, and 16C of the majority logic voters 20 so as to effect through the operation of the "NAND" gates 28, 29 and 30 and the "NAND" gate 31, as heretofore explained, negative going voted timing pulses at the output line 25, as shown graphically by FIG. 7.

The negative going timing pulses will be applied then to a PNP type buffer transistor, such as indicated by the numerals 340A, 340B and 340C of FIGS. 2 and 4, to control the charging and discharging cycles of the timing capacitor 122 of the respective oscillators 10A, 10B and 10C, as heretofore explained and shown graphically by FIG. 7.

Similarly in the form of the invention illustrated by FIGS. 2 and 4, the output lines 14A, 14B and 14C may lead from the "$\overline{Q}$" output terminals 169A, 169B and 169C of the respective multivibrators 12A, 12B and 12C to cause timed positive going pulses to be applied at the respective input terminals 16A, 16B and 16C of the majority logic voters 300A, 300B and 300C so as to in turn effect positive going voted timing pulses at the output lines 25A, 25B and 25C to be applied to an NPN type buffer transistor such as indicated in FIGS. 1 and 3 by the numerals 22A, 22B and 22C to control the charging and discharging cycles of the timing capacitor 122 of the respective oscillators 10A, 10B and 10C as heretofore explained with reference to FIGS. 1 and 3.

OPERATION

The present invention provides a method of synchronizing the timing pulses of three channels of a triplicated timing system through a feedback means utilized to obtain the desired synchronization. The network also provides a fail-operative feature plus a minimization of temperature deviations.

In the present invention, there is provided a system through which the timing pulses for triplicated counters may be effectively synchronized. Since the period, the pulse width and the phase of the timing pulses are dependent on capacitors and resistors, it is very difficult to fix these parameters and with temperature deviations it is impossible to keep the timing pulses identical without a synchronization network such as provided in the present invention.

The network of the present invention includes a unijunction transistor relaxation oscillator 10 coupled with a multivibrator 12 as a timer, plus a voter 20 or 300 and a feedback means to provide synchronization. The timing pulses generated in the timers 12A, 12B and 12C of channels A, B and C pass through a majority logic digital voter. The output of the voter is a pulse whose leading edge follows the second leading edge of the three timing pulses and whose succeeding edge follows the second succeeding edge of the three timing pulses (majority logic; output$=AB+BC+AC$) as shown graphically in FIGS. 6 and 7.

The output of the voter is fed back through a feedback means which will discharge the timing capacitor 122 at the leading edge of the voted timing pulse; thus ending the period of the oscillator. The succeeding edge of the voted timing pulse will release the capacitor 122, thus allowing the capacitor 122 to start charging which will start the timing cycle again.

Since similar voter and feedback networks are present in all three channels, all deviations in period, pulse width, and phase of the timing networks are eliminated. The same feedback principle also minimizes temperature variations. A fail-operate feature is incorporated in the system because of the voter. Each voter is a majority logic network which will function as long as any two of the three inputs agree.

There is thus provided in the present invention means whereby (1) the period, pulse width, and phase of the timing pulses in all three channels of a triplicated system are synchronized (2) temperature variation in the period, pulse width, and phase of the timing pulses are minimized and (3) a fail-operate protective feature has been incorporated in the system.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A redundant timing system comprising a plurality of timing channels, each timing channel including trigger means for providing a trigger pulse, and a timer connected to the trigger means to provide a timed electrical output pulse in response to the trigger pulse and including a multivibrator operable to effect the timed electrical output pulse, the operation of the multivibrator being initiated by the trigger means; a majority logic voter network, each voter network being operably connected to said timed electrical output pulses provided by the multivibrators in each of the plurality of timing channels, each voter network providing an electrical voter output pulse upon a majority of the multivibrators terminating the timed electrical output pulse provided thereby; and feedback means operatively connecting said trigger means to condition the trigger means to initiate operation of the multivibrator of the corresponding timing channel so as provide a succeeding electrical output pulse.

2. The redundant system defined by claim 1 in which the trigger means includes:
- a unijunction transistor having an emitter element, a base (1) element and a base (2) element,
- the unijunction transistor being operable to apply a trigger pulse at the base (1) element to initiate the operation of the timer,
- a timing capacitor connected between the emitter element and ground,
- a charging circuit for the timing capacitor effective during a timed interval to charge the capacitor to a value to bias the emitter element so as to cause the unijunction transistor to fire and to apply the trigger pulse at the base (1) element,
- the feedback means including discharging means for timing capacitor rendered effective upon the corresponding voter network providing said electrical voter output pulse,
- and the discharging means for the timing capacitor being rendered ineffective upon cessation of the voter output pulse to thereupon render said charging circuit effective during said timed interval to charge the capacitor to said value to cause the unijunction transistor to apply a trigger pulse to again initiate operation of the timer of the corresponding timing channel so as to provide a succeeding timed electrical output pulse.

3. The redundant timing system defined by claim 1 in which the timer includes:
- a multivibrator operable to effect the timed electrical output pulses,
- the trigger means includes:
- a unijunction transistor having an emitter element, a base (1) element and a base (2) element,
- the unijunction transistor being operable to apply a trigger pulse at the base (1) element to initiate the operation of the multivibrator,
- a timing capacitor connected between the emitter element and ground,
- a charging circuit for the timing capacitor effective during a timed interval to charge the capacitor to a value to bias the emitter element so as to cause the unijunction transistor to fire and to apply the trigger pulse at the base (1) element,
- the feedback means including discharging means for the timing capacitor rendered effective upon the corresponding voter network providing said electrical voter output pulse, and the discharging means for the timing capacitor being rendered ineffective upon cessation of the voter output pulse to thereupon render said charging circuit effective during said timed interval to charge the capacitor to said value to cause the unijunction transistor to apply a trigger pulse to again initiate operation of the multivibrator of the corresponding timing channel so as to provide a succeeding timed electrical output pulse.

4. The combination comprising a timer to provide a timed electrical output pulse, trigger means coupled to said timer to provide a trigger pulse to initiate operation of the timer to provide said timed output pulse, a majority logic voter to effect an output pulse in response to a majority of a plurality of timed electrical pulses including said first mentioned timed electrical output pulse, and feedback means operatively connecting said voter output pulse to said trigger means to condition the trigger means to initiate operation of the timer after termination of said voter output pulse and including switching means for controlling the operation of the trigger means, said switching means being responsive to the voter output pulse to condition the trigger means to initiate the operation of the timer for a predetermined interval of time after termination of said voter output pulse.

5. The combination defined by claim 4 in which the trigger means includes:

a unijunction relaxation oscillator for effecting the trigger pulse, a timing capacitor for controlling operation of the unijunction relaxation oscillator, a charging circuit and a discharging circuit for the timing capacitor, means operatively connecting said switching means in one of said circuits, said switching means being responsive to termination of a voter output pulse to initiate a charging of said capacitor through said charging circuit to render said timing capacitor effective to cause the unijunction relaxation oscillator to provide a trigger pulse to initiate operation of the timer, and said switching means being responsive to a succeeding voter output pulse to render effective the discharging circuit for said timing capacitor for the duration of said succeeding voter output pulse.

6. The combination defined by claim 5 in which the oscillator includes:

a unijunction transistor having a controlling emitter, means operatively connecting the timing capacitor to the controlling emitter so as to render the unijunction transistor effective to provide said trigger pulse upon the charge applied to said timing capacitor through said charging circuit exceeding a predetermined threshold value.

7. The combination defined by claim 4 in which the timer includes:

a one shot multivibrator, and the trigger means includes a unijunction relaxation oscillator for providing the trigger pulse to initiate operation of the one shot multivibrator to provide said timed electrical output pulse.

8. The combination defined by claim 7 in which the unijunction relaxation oscillator includes:

a unijunction transistor having a controlling emitter, a timing capacitor, a charging circuit and a discharging circuit for the timing capacitor, the feedback means includes a buffer transistor, means operatively connecting the buffer transistor in one of said circuits, said buffer transistor being responsive to termination of a voter output pulse to initiate a charging of said capacitor through said charging circuit for a predetermined timed interval, means operatively connecting the timing capacitor to the controlling emitter of the unijunction transistor so as to render the unijunction transistor effective to provide said trigger pulse upon the charge applied to said timing capacitor through said charging circuit exceeding a predetermined threshold value, and said buffer transistor being responsive to a succeeding voter output pulse to render effective said discharging circuit for said timing capacitor for the duration of said succeeding voter output pulse.

9. A method of controlling a redundant timing system including a plurality of timing channels, said method comprising the steps of applying in each of said timing channels an electrical trigger pulse, providing an electrical timing pulse having a leading edge defined by said trigger pulse, providing said timing pulse for a predetermined duration of time with a succeeding edge defined by a termination of said predetermined duration of time, selecting from the timing pulses in said timing channels a majority pulse having a leading edge defined by the leading edge of a majority of the timing pulses, sampling in each of said timing channels is the majority pulse, further selecting from the timing pulses in said timing channels said majority pulse having a succeeding edge defined by the succeeding edge of a majority of the timing pulses in said channels, and terminating the trigger pulse in each of said channels at a time defined by the leading edge of the majority pulse.

10. The method defined by claim 9 including the steps of sampling in each of said timing channels the majority pulse, terminating the trigger pulse in each of said channels at a time defined by the leading edge of the majority pulse, and providing a succeeding trigger pulse in each of said channels at predetermined time intervals after a time defined by the succeeding edge of the majority pulse.

11. A method of controlling a redundant timing system including three timing channels, said method comprising the steps of applying in each of said three timing channels an electrical trigger pulse, providing an electrical timing pulse in each of said three timing channels having a leading edge defined by the electrical trigger pulse in a corresponding timing channel, providing each of said timing pulses for a predetermined duration of time with a succeeding edge defined by a termination of said predetermined duration of time, selecting from the timing pulses in each of said three timing channels a majority pulse having a leading edge defined by at least a second of the three leading edges to occur of the three timing pulses, and further selecting from the timing pulses in each of said three timing channels said majority pulse with a succeeding edge defined by at least a second of the three succeeding edges to occur of the three timing pulses, sampling in each of said three timing channels the majority pulse, terminating the trigger pulse in each of said three timing channels at a time defined by the leading edge of the majority pulse, providing a succeeding trigger pulse in each of said three channels at predetermined time intervals after a time defined by the succeeding edge of the majority pulse, and providing succeeding timing pulses in each of said three timing channels as heretofore defined by the trigger pulse.

References Cited

UNITED STATES PATENTS

| | | | |
|---|---|---|---|
| 2,910,584 | 10/1959 | Steele | 307—219 X |
| 3,116,477 | 12/1963 | Bradbury | 307—219 X |
| 3,409,881 | 11/1968 | Marcus et al. | 307—211 X |
| 3,411,107 | 11/1968 | Rees | 307—211 X |

JOHN S. HEYMAN, Primary Examiner

U.S. Cl. X.R.

307—211, 219, 273, 284, 293; 328—74

PO-1050
(5/69)

UNITED STATES PATENT OFFICE
CERTIFICATE OF CORRECTION

Patent No. 3,522,455 Dated August 4, 1970

Inventor(s) Frank J. Thomas and David A. Tawfik

It is certified that error appears in the above-identified patent and that said Letters Patent are hereby corrected as shown below:

Claim 2, column 12, line 45 after "for" insert - - the - -.

Claim 9, column 14, line 34 delete "is".

SIGNED AND
SEALED
OCT 20 1970

(SEAL)
Attest:

Edward M. Fletcher, Jr.
Attesting Officer

WILLIAM E. SCHUYLER, JR.
Commissioner of Patents